United States Patent
Gupta et al.

(10) Patent No.: US 12,204,957 B2
(45) Date of Patent: Jan. 21, 2025

(54) SYSTEM AND METHOD FOR BULK UPDATE OF RESOURCE DATA FOR VIEW PARAMETERS

(71) Applicant: Rakuten Symphony, Inc., Tokyo (JP)

(72) Inventors: Rohit Gupta, Indore (IN); Yogesh Chouhan, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/908,356

(22) PCT Filed: Aug. 1, 2022

(86) PCT No.: PCT/US2022/039043
§ 371 (c)(1),
(2) Date: Aug. 31, 2022

(87) PCT Pub. No.: WO2024/030113
PCT Pub. Date: Feb. 8, 2024

(65) Prior Publication Data
US 2024/0220342 A1    Jul. 4, 2024

(51) Int. Cl.
*G06F 9/54*    (2006.01)
(52) U.S. Cl.
CPC .................................. *G06F 9/544* (2013.01)
(58) Field of Classification Search
None
See application file for complete search history.

(56) References Cited

U.S. PATENT DOCUMENTS

| | | | |
|---|---|---|---|
| 2013/0138626 A1* | 5/2013 | Delafranier | G06F 16/90324 707/713 |
| 2015/0149491 A1 | 5/2015 | Redlich et al. | |
| 2023/0418823 A1* | 12/2023 | Berkman | G06F 11/1448 |

OTHER PUBLICATIONS

International Search Report dated Dec. 6, 2022 in Application No. PCT/US22/39043.
Written Opinion of the International Searching Authority dated Dec. 6, 20222 in Application No. PCT/US22/39043.

* cited by examiner

*Primary Examiner* — Craig C Dorais
(74) *Attorney, Agent, or Firm* — Sughrue Mion, PLLC

(57) ABSTRACT

A system for bulk updating resource data of parameters included in a view is provided. The system includes at least one processor configured to: receive a user request to bulk import data in a file including rows of the data, each row corresponding to a different instance of the view; make an import data API call to bulk import the data into one or more tables to which the data of the parameters is to be saved; make a save data API call to update existing resource data of the parameters, stored in the one or more tables, with the data included in the file; and update, in the one or more tables, the existing resource data of the parameters for the plurality of instances with the data included in the file, wherein the import data save data APIs are generic across a plurality of views and tables.

19 Claims, 10 Drawing Sheets

| | A | B | C | D | E | F |
|---|---|---|---|---|---|---|
| 1 | Work-Order | Site Identifier | Task Action Name | Actual End Date | Project Status | Isdeleted |
| 2 | BULKT-60 | SiteforTab_ytu | Complete | | Yet To Start | false |
| 3 | BULKT-59 | SiteforTab_ytu | Complete | | Yet To Start | false |
| 4 | BULKT-55 | SiteforTab_ytu | Complete | | Yet To Start | false |

MetaDataSheet | TaskExport | README

SYSTEM AND METHOD FOR BULK UPDATE OF RESOURCE DATA FOR VIEW PARAMETERS

CROSS REFERENCE TO RELATED APPLICATIONS

This application is a National Stage of International Application No. PCT/US2022/039043 filed Aug. 1, 2022.

BACKGROUND

Databases may be used to store data for a variety of applications. For example, in business environments, databases may be used to store and manage job information, employee information, site information, task information, and other related data for an application. The data may be input and/or viewed via different user interface views that store and/or fetch the data to/from the database tables.

A related art view building application may generate and configure different views for one or more other applications in an application platform (e.g., a cloud-based application platform for an enterprise or business). Each view corresponds to a screen, form, user interface, or page through which data may be input to respective fields (i.e., parameters) of the view and saved or stored in one or more databases or tables of the one or more other applications, and/or data may be fetched from the one or more databases or tables and output for display on respective fields of the view. The related art view building application allows a user to generate or modify a view by configuring the fields to be included in the view, from among previously-registered fields corresponding to backend resource fields (e.g., database table columns) of the one or more other applications.

When a user wants to input data into a view (e.g., form), the view is displayed on a user interface screen (e.g., a user interface of a corresponding application for which the view is created). The user can then manually input data into the respective fields of the displayed view, and save the view data into the backend table(s) that include columns corresponding to the respective view fields. This process can be repeated any number of times to create plural instances or records for a particular view. For example, where a task is to be performed multiple times on a particular job site or work order, a form (or view) may be filled out each time the task is performed and the corresponding input data may be stored in the backend table(s).

Where plural records or instances of data for a particular view are input and stored in a database or table(s), a user may desire to perform updates of the input data across the plural instances. In the related art view building application, however, a bulk update function for resource data is not available. Instead a user would have to manually retrieve the data for each instance of the view and perform the update, one instance at a time. Such a manual instance-by-instance process is time consuming, inconvenient, prone to human error. Further, because resource data for each instance has to be fetched one instance at a time, the manual updating process increases load on system resources (i.e., processor load, communication bandwidth, memory usage, etc.).

Additionally, to save the updated data in the related art view UI, an API must be created for each backend table to which view data of that view will be saved, and integrated into the UI. For example, if a particular view includes view fields (i.e., parameters) linked to three different backend resources (i.e., database tables), then three different API calls must be integrated into the UI and executed. Further, if a view is modified to include an additional field, then an additional custom API must be written to save view data input to that field to its corresponding backend resource. This increases code complexity and results in multiple API creation and integration into a view. Further, any changes to views in the related art view building application are time consuming and inconvenient to a user, due to the additional API customization and development that is required.

SUMMARY

According to one or more embodiments, systems and methods are provided for bulk updating, for plural instances of a view, resource data of parameters included in the view, by executing a dynamic bulk updating function that can be generically integrated into any view for importing and bulk updating resource data for a plurality of instances of the view, thereby conserving system resources and increasing user convenience to perform bulk updates, as well as eliminating the need for and development of custom APIs to save updated resource data of multiple instances of a view.

According to embodiments, a system for bulk updating resource data of parameters included in a view, includes: at least one memory storing instructions; and at least one processor configured to execute the instructions to: receive a user request to bulk import data of the parameters for a plurality of instances of the view, the received user request including a file including rows of the data, each row corresponding to a different instance of the view; based on the received user request, make, by a first application, an import data application programming interface (API) call to bulk import the data into one or more tables to which the data of the parameters is to be saved; based on the import data API call, make a save data API call to update existing resource data of the parameters, stored in the one or more tables, with the data included in the file; and based on the save data API call, update, in the one or more tables, the existing resource data of the parameters for the plurality of instances with the data included in the file, wherein the import data API and the save data API are generic across a plurality of views and a plurality of tables.

The file may further include: a row of column headers with identifiers of the parameters included in respective columns of each of the rows of data; and metadata including the identification information of the parameters, validation information for each parameter, and table information indicating the one or more tables for which resource data of the parameters is stored.

The at least one processor may be further configured to execute the instructions to, based on the import data API call, validate the row of column headers with the metadata by confirming that identifiers of the parameters included in the row of column headers correspond to the identification information of the parameters.

The at least one processor may be further configured to execute the instructions to: for each of the data in a row, perform a validation by comparing the data to the validation information; and make the save data API call for a row based on the validation being performed successfully.

The save data API call may be made separately for each of the rows of the data; and an input to the save data API may include identifiers of the one or more tables, identifiers of the parameters, and data included in a corresponding row for which the save data API is called.

The at least one processor may be further configured to execute the instructions to: obtain information of a second application; send, based on the obtained information of the second application, a request to the second application to store first data, from among the data, of at least one first parameter, from among the parameters, to at least one table associated with the second application, from among the one or more tables; and store, by the second application, the first data to the at least one table.

The at least one processor may be further configured to execute the instructions to obtain identifiers of one or more primary keys corresponding to the view; and the input to the save data API may further include the identifiers of the one or more primary keys, and one or more primary key values corresponding to the instance of the view.

The at least one processor may be further configured to execute the instructions to, for each of the at least one table, search for an existing data object or record corresponding to a primary key value of the one or more primary key values.

The at least one processor may be further configured to execute the instructions to: generate a response file indicating, for each of the rows of the data, whether the updating is successfully; and return, by the import data API, the generated response file for output to a user.

According to embodiments, a method, performed by at least one processor, for bulk updating resource data of parameters included in a view, includes: receiving a user request to bulk import data of the parameters for a plurality of instances of the view, the received user request including a file including rows of the data, each row corresponding to a different instance of the view; based on the received user request, making, by a first application, an import data application programming interface (API) call to bulk import the data into one or more tables to which the data of the parameters is to be saved; based on the import data API call, making a save data API call to update existing resource data of the parameters, stored in the one or more tables, with the data included in the file; and based on the save data API call, updating, in the one or more tables, the existing resource data of the parameters for the plurality of instances with the data included in the file, wherein the import data API and the save data API are generic across a plurality of views and a plurality of tables.

The file may further include: a row of column headers with identifiers of the parameters included in respective columns of each of the rows of data; and metadata including the identification information of the parameters, validation information for each parameter, and table information indicating the one or more tables for which resource data of the parameters is stored.

The method may further include, based on the import data API call, validating the row of column headers with the metadata by confirming that identifiers of the parameters included in the row of column headers correspond to the identification information of the parameters.

The making the save data API call may include: for each of the data in a row, performing a validation by comparing the data to the validation information; and making the save data API call for a row based on the validation being performed successfully.

The save data API call may be made separately for each of the rows of the data; and an input to the save data API may include identifiers of the one or more tables, identifiers of the parameters, and data included in a corresponding row for which the save data API is called.

The updating the existing resource data may include: obtaining information of a second application; sending, based on the obtained information of the second application, a request to the second application to store first data, from among the data, of at least one first parameter, from among the parameters, to at least one table associated with the second application, from among the one or more tables; and storing, by the second application, the first data to the at least one table.

The making the save data API call may include obtaining identifiers of one or more primary keys corresponding to the view; and the input to the save data API may further include the identifiers of the one or more primary keys, and one or more primary key values corresponding to the instance of the view.

The updating the existing resource data may include, for each of the at least one table, searching for an existing data object or record corresponding to a primary key value of the one or more primary key values.

The method may further include: generating a response file indicating, for each of the rows of the data, whether the updating is successfully; and returning, by the import data API, the generated response file for output to a user.

According to embodiments, a non-transitory computer-readable recording medium has recorded thereon instructions executable by at least one processor to perform a method for bulk updating resource data of parameters included in a view, the method including: receiving a user request to bulk import data of the parameters for a plurality of instances of the view, the received user request including a file including rows of the data, each row corresponding to a different instance of the view; based on the received user request, making, by a first application, an import data application programming interface (API) call to bulk import the data into one or more tables to which the data of the parameters is to be saved; based on the import data API call, making a save data API call to update existing resource data of the parameters, stored in the one or more tables, with the data included in the file; and based on the save data API call, updating, in the one or more tables, the existing resource data of the parameters for the plurality of instances with the data included in the file, wherein the import data API and the save data API are generic across a plurality of views and a plurality of tables.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein:

FIG. 5 illustrates an example of an input to a save data API in accordance with an embodiment;

DETAILED DESCRIPTION

Figure 1:
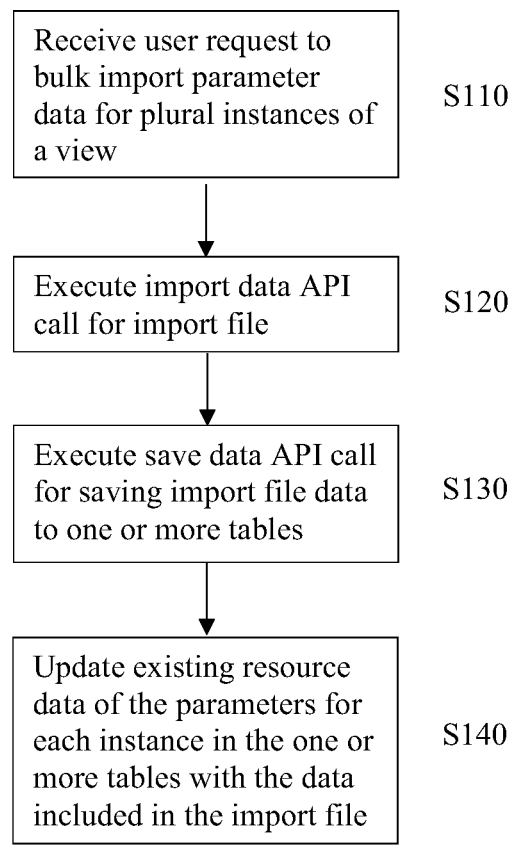
FIG. 1 illustrates a flowchart of a method for bulk updating resource data of parameters included in a view via a generic bulk update function, according to an embodiment.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

As set forth above, bulk update or import of resource data is not available in related art view building or view displaying applications. Further, because each view (e.g., form) has different combinations of parameters (e.g., input fields) mapped to different tables and table columns in which the corresponding resource data (i.e., data input by a user to the parameters of an instance of the view) is stored, a developer would have to write an application programming interface (API) customized for each view in order to import and save resource data for a bulk update. Any changes to the fields in the view would therefore require changes in the APIs developed for the view to fetch the resource data for the respective fields. This increases code complexity and results in multiple API creation and integration into a view. Moreover, any changes to views in the related art view building application are time consuming and inconvenient to a user, due to the additional API customization and development that is required to synchronize the changed parameters with corresponding tables and the mechanisms by which update data input to the view parameters are stored in the tables.

Example embodiments of the present disclosure provide a method and system that executes a generic save data API to update resource data view data based on the retrieved view details. As a result, a same view may store view data into plural different resources and different views may be configured and the same view may be modified with different parameters (or data fields) without requiring multiple API creation and integration into views, thereby minimizing code complexity, development time, and user inconvenience.

Example embodiments of the present disclosure provide a method and system in which a generic bulk update function is incorporated into a resource data viewing application (e.g., the above-described related art view building application). The generic bulk updating function in accordance with example embodiments utilizes application programming interfaces (APIs) to import update data for a plurality of instances of a view and update corresponding resources (e.g., columns of tables) with the data. As a result, the update function may be generically used to bulk update resource data for any of plural views and for any configuration or modification of a view, thereby eliminating the required development and attendant user inconvenience and time to configure customized APIs and mechanisms by which updated data is imported and stored in bulk.

Example embodiments of the present disclosure provide a method and system that executes backend logic and makes a generic call to import and save update data into backend resources. As a result, different views may be configured and the same view may be modified with different parameters (or data fields) without requiring further API development/ customization or hardcoding to achieve a working bulk update functionality, thereby reducing multiple API creation and integration into views and minimizing code complexity, development time, and user inconvenience.

FIG. 1 illustrates a flowchart of a method 100 for bulk updating resource data of parameters included in a view via a generic bulk update function, according to an embodiment. The method 100 of FIG. 1 may be performed by at least one processor executing instructions stored in at least one memory.

Referring to FIG. 1, at operation S110, a user request to bulk import (or update) data of parameters for a plurality of instances of a view is received. The user request may be received by a first application (e.g., view building application) that is an application for configuring (e.g., building) and viewing different views for one or more other applications (e.g., one or more other applications integrated with or into the first application), or may be received by the one or more other applications (e.g., on a screen for accessing views corresponding to the other application). The one or more other applications may be applications installed and deployed in an application platform, such as a cloud-based application platform for an enterprise or business. The one or more other applications and/or the first application may be deployed as containerized or microservices-based applications.

A view may correspond to a screen, form, user interface, or page through which data may be input to respective parameters (i.e., data fields such as Name, Gender, Age, Address, Equipment Information, etc.) of the view and stored in one or more databases or tables of (or associated with) the one or more other applications, and/or data may be fetched from the one or more databases or tables and output for display on respective parameters of the view. The first application allows a user to configure (e.g., generate or modify) a view by selecting the parameters to be included in the view, from among parameters previously registered in the first application and corresponding to backend resource fields (e.g., table columns) of the one or more other applications. For example, the previously-registered parameters may be listed or otherwise displayed for selection in a view configuration screen of the first application, and dragged and dropped onto a view being configured.

The user request to bulk import the resource data may be input via a user interface screen of the first application, or of a different application. The bulk import of resource data may be with respect to a plurality of instances of a view. Each instance of a view may be an instance in which data is input to the parameters of the view (e.g., form). Thus, for a particular view, data may be input a plurality of different times and stored in one or more corresponding tables in which columns are respectively associated with the parameters.

Figure 2:
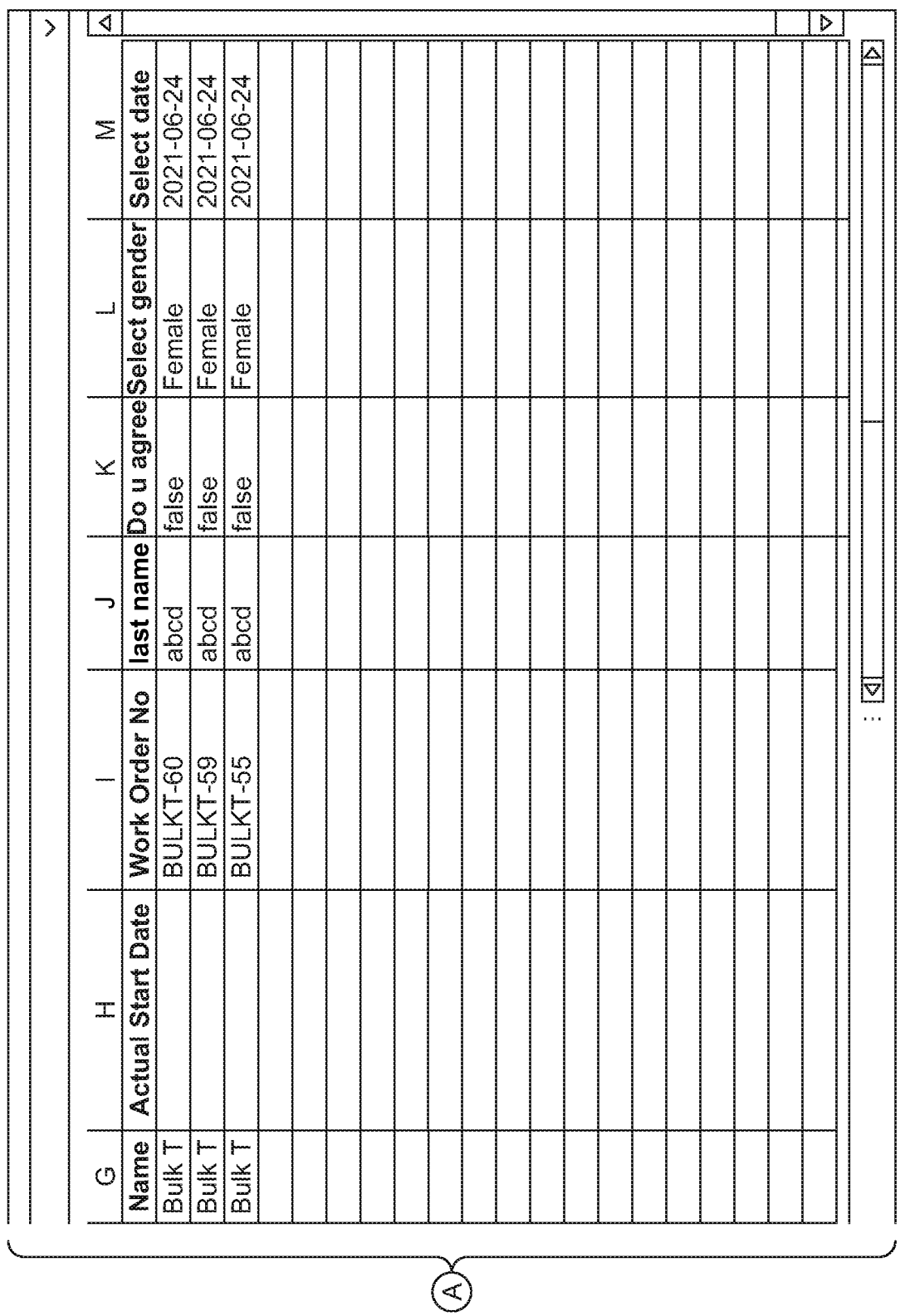
FIG. 2 illustrates an example import file to which update data of a plurality of instances of a view is included, according to an embodiment.

The user request may include a file (e.g., a spreadsheet) with rows of the update data, each row corresponding to a different instance of a view. An example of file is shown in FIG. 2. The file may be generated by bulk exporting resource data of the plurality of instances of the view, after which a user can easily modify the data as presented in bulk in rows of the file. By way of example, the file may be generated by a bulk export function as disclosed in PCT/US2022/038438, the disclosure of which is incorporated herein by reference in its entirety. Referring to FIG. 2, the file may include rows of the update data, and a row of column headers with identifiers of parameters included in respective columns of each of the rows of data.

Furthermore, the file may include metadata (e.g., as one or more separate information sheets or tabs). The metadata may include at least one of identification of a view, identification information of the parameters, validation information for each parameter, table information indicating one or more tables for which resource data of the parameters is stored, primary key information identifying at least one primary key for each table and/or other application associated with each table, etc. At least some of the metadata may be hidden (e.g., a hidden tab, row, or column). For example, metadata defining paths for the resource tables (e.g., microservice or application paths used by the bulk update function or an API call thereof to request saving of the update data) may be hidden from view to prevent a user from modifying the path definitions. The validation information may indicate at least one of a data type of each parameter (e.g., text, number, date, selectable option, drop-down selectable option, radio button selectable option, etc.), a requirement of each parameter (e.g., mandatory, optional, read-only, etc.), constraints for each parameter (e.g., maximum length, minimum length, possible or selectable values, etc.), parameter relationship information (e.g., Parameter B is mandatory or provided based on a value of Parameter A being X), etc. With respect to the requirement of each parameter, a mandatory requirement means that the parameter is required to have a data input when the view (e.g., form) is filled out by a user. Conversely, an optional requirement means that the parameter need not be filled out. The headers of each column in the import file may be color-coded in correspondence with the requirement of each parameter as defined in the validations, e.g., a header cell or identifier for a parameter may be yellow for an optional parameter, grey for a read-only parameter, and blue for a mandatory parameter.

Referring back to FIG. 1, in operation S120, an import data API call is made by the first application to bulk import the data included in the rows of the file (i.e., import file) into one or more tables (i.e., resources) to which the data of the parameters is to be saved. For example, the import data API call may be made in accordance with execution logic of the first application, in response to the received user request to bulk import or update the data. An input to the import data API call may include the import file. The input may further include a view identifier corresponding to the import file (alternatively, the view identifier may be obtained from the import file).

In operation S130, a save data API call is made to update existing resource data of the parameters, stored in the one or more tables, with the data included in the import file. The save data API call may be made by the import data API or execution logic of the first application. Here, the save data API call may be made separately for each row (i.e., view instance) of update data in the file. An input to the save data API call may include the identifiers of the one or more tables and the identifiers of the parameters, obtained from the metadata included in the file. According to another embodiment, the identifiers of the one or more tables and the identifiers of the parameters may be obtained from a view details table, such as described in PCT/US2022/038438. The input to the save data API further includes the input data, obtained from a corresponding row of the file.

By way of example, the input to the save data API call may be include at least one JavaScript Object Notation (JSON) string. Further, the input may include a plurality of JSON strings, with each string corresponding to a respective table and containing the identifiers of the parameters associated with that table (e.g., associated with columns of that table, with each parameter having its data stored in a corresponding column) as well as the input data of the parameters associated with that table (i.e., the input data to be stored in that table). The input may further include identifiers of the primary keys.

In operation S140, the existing resource data of the parameters for each of the plurality of instances of the view is updated in the one or more tables with the data included in the import file. Here, the corresponding instance or data object/record for the instance to be updated can be identified by the primary key values included in the rows of the data.

According to example embodiments, because the view, parameter, and table as identifiers and information are obtained (e.g., from the import file) via execution logic, a generic import data API and a generic save data API may be incorporated into the first application (e.g., view UI) to bulk update resource data of a plurality of instances of a view.

Figure 3:
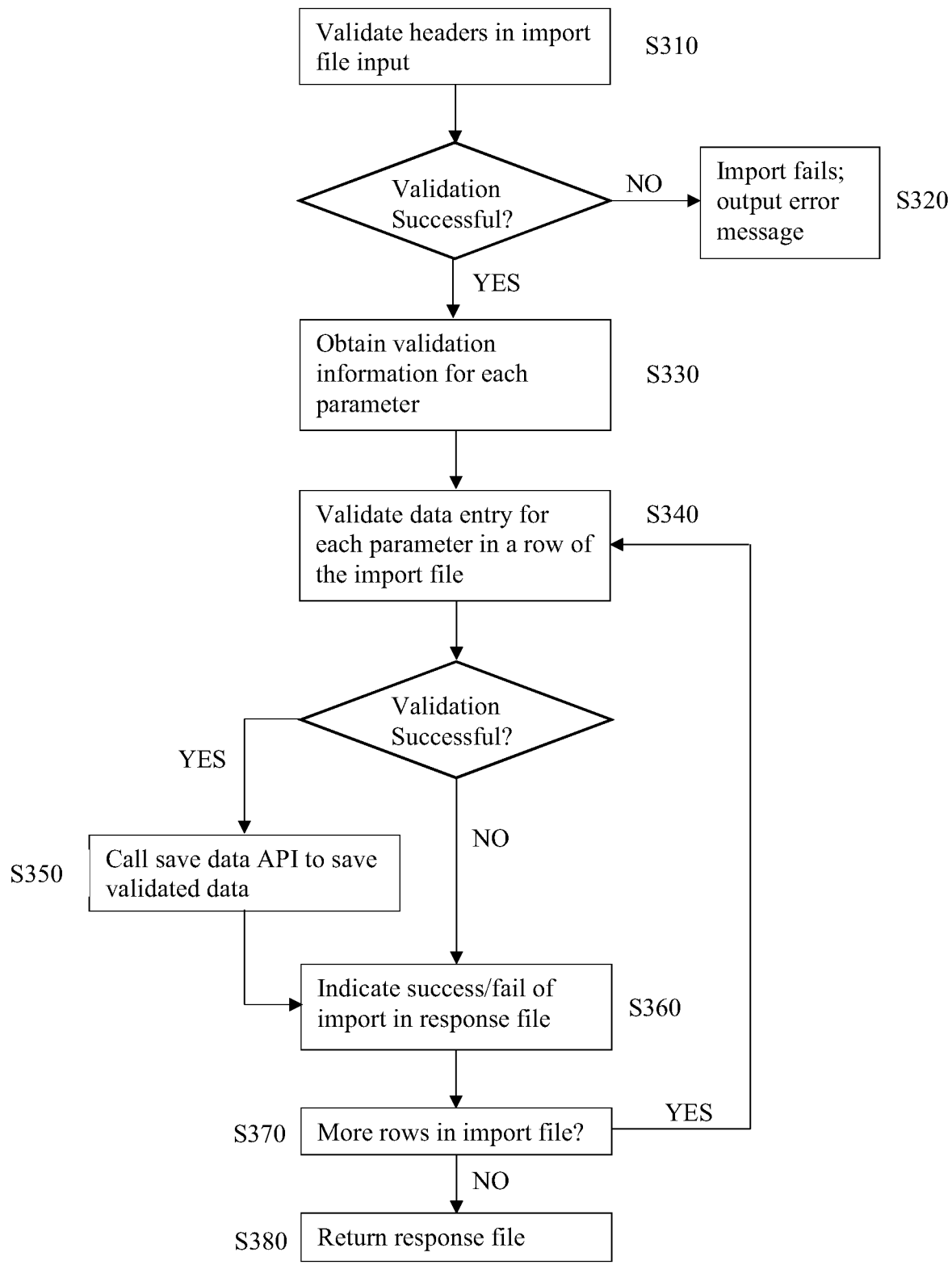
FIG. 3 illustrates a flowchart of a method for bulk updating resource data validated from an input file, according to an embodiment.

FIG. 3 illustrates a flowchart of a method 300 for bulk updating resource data validated from an input file, according to an embodiment. The method 300 of FIG. 3 may be performed by at least one processor executing instructions stored in at least one memory. The method 300 of FIG. 3 may be performed (at least in part) by an import data API, and may correspond to operations S130 and S140 of FIG. 1. Further, the method 300 of FIG. 3 may be performed based on a received import file, as described above.

Referring to FIG. 3, at operation S310, based on the import data API call, the row of column headers in the import file is validated using the metadata included in the file. For example, the validation may be performed by conforming that the identifiers of the parameters included in the row of column headers correspond to or match the identification information of parameters included in the metadata.

If the validation fails, then at operation S320, the process ends. In this case, for example, an error message may be output by the first application.

If the validation succeeds, then at operation S330, validation information for each of the parameters is obtained from the metadata included in the import file.

At operation S340, for each data entry (e.g., cell) in a row of the import file, the data is validated using the validation information. For example, the validation may confirm that the data type is correct, that the data satisfies any defined constraints, that the requirement for the parameter is satisfied (e.g., data is included where a parameter is defined as mandatory, data for another parameter is included based on parameter relationship information, etc.), etc.

If the validation for each data entry in a row (i.e., corresponding to an instance of the view) succeeds, then at operation S350, the save data API is called for that row of data. Upon successful saving of the data, success is indicated for the corresponding row in a response file in operation S360.

If, however, the validation of operation S340 fails or the data fails to save properly, then at operation S360, failure is indicated for the corresponding row in the response file.

At operation S370, it is determined whether there are any more rows of data included in the import file to be saved. If so, the method returns to step S340 (or, S350 in another embodiment). That is, the validating and saving of data iterates through each row of data in the import file.

If, at operation S370, it is determined that there are no more rows of data left to be saved in the import file, the response file is returned by the import data API at operation S380. In this case, the response file may be shown to a user, with an indication of success or failure for each row, as described above.

Figure 4:
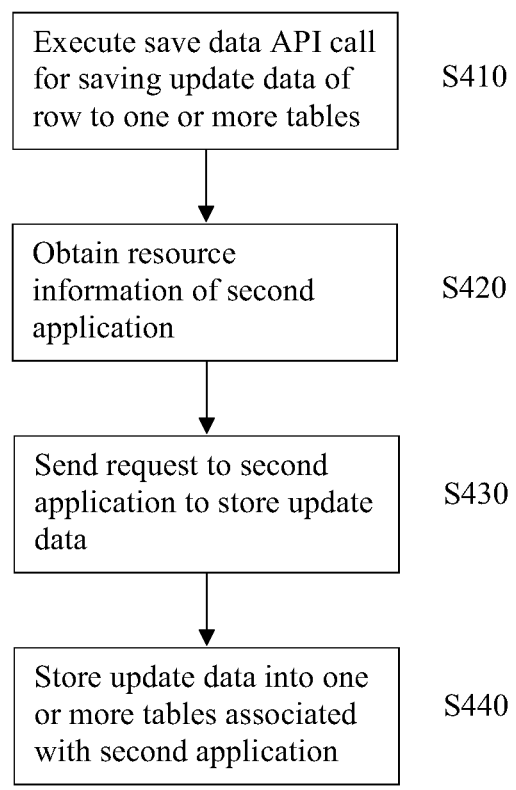
FIG. 4 illustrates a flowchart of a method for saving data into one or more tables, according to an embodiment.

FIG. 4 illustrates a flowchart of a method 400 for saving data into one or more tables, according to an embodiment. The method 400 of FIG. 4 may be performed by at least one processor executing instructions stored in at least one memory. The method 400 of FIG. 4 may be performed (at least in part) by a save data API, and may correspond to operation S140 of FIG. 1 and/or operation S350 of FIG. 3. Further, the method 400 of FIG. 4 may be performed based on a save data API being called with an input obtained from the import file.

Referring to FIG. 4, at operation S410, a save data API call is made to save input data of a row of the import file to one or more tables. The save data API call may be made by execution logic of the import data API or the first application. According to an embodiment, the save data API is generic across a plurality of views, and across a plurality of tables. The same save data API may be called once to save input data into a plurality of corresponding backend tables. As a result, multiple API creation and integration and the attendant code complexity can be eliminated.

An input to the save data API call includes the identifiers of the one or more tables and the identifiers of the parameters, obtained from the metadata included in the import file (though in another embodiment, the identifiers may be obtained from a view details table, as set forth above). The input to the save data API further includes the update data. By way of example, the input to the save data API call may be include at least one JavaScript Object Notation (JSON) string. Further, the input may include a plurality of JSON strings, with each string corresponding to a respective table and containing the identifiers of the parameters associated with that table (e.g., associated with columns of that table, with each parameter having its data stored in a corresponding column) as well as the update data of the parameters associated with that table (i.e., the input data to be stored in that table). The input, i.e., JSON strings, may be generated by the import data API (or the first application) by executing logic that processes the import file and obtains corresponding information (e.g., identifiers and the input data) from the import file.

At operation S420, resource information (or application/microservice information) of at least one second application is obtained. The resource information may include application information (e.g., at least one of application/microservice name, application/microservice path, etc.) of each application associated with or including a table(s) in which the parameters of the current view (i.e., corresponding to the import file) are stored. In the present embodiment, the resource information is obtained from the metadata included in the import file (e.g., from a hidden tab or cell(s)).

According to another embodiment, the first application obtains the resource information, based on the identifiers of the one or more tables, from resource information pre-registered in the first application. Specifically, in accordance with another embodiment, the first application obtains resource information corresponding to parameters and/or tables identified for a current view from a resource information storage (e.g., database(s), table(s), resource file(s), etc.). The resource information identifies the application(s) (e.g., second application) including or associated with the table(s) in which the parameters of the current view are stored. To this end, the resource information storage maps applications to tables respectively associated with the applications. Thus, a request by the first application for the resource information includes identification information of each table corresponding to the current view (i.e., each table including a parameter included in the current view). The request may be made by backend logic of the first application, e.g., via a backend API call.

As set forth above, one or more other applications may be integrated into the first application such that views may be built for the other applications and/or such that views may be configured with parameters for inputting and/or viewing resource data stored in association with the other applications (e.g., stored in tables of or associated with the other applications). The tables included in (or associated with) each of the integrated applications may be previously registered in the first application, such as by including mapping information of the tables to their locations in the resource information storage (e.g., resource information table). Here, the locations may be the respective applications in which the tables are stored (or with which the tables are associated). For example, the resource information may be application or microservice information including at least one of an application name, a microservice name, a microservice path, etc. Thus, the resource information may be application or microservice information obtained for each table included in or identified in the view details for a particular view. An example of the resource information obtained for a current view in which four tables (Table 1, Table 2, Table 3, and Table 4) are identified is provided in TABLE 1 below:

TABLE 1

| Table 1 | Microservice 1, path1 |
|---------|----------------------|
| Table 2 | Microservice 2, path2 |
| Table 3 | Microservice 3, path3 |
| Table 4 | Microservice 4, path4 |

Referring back to FIG. 4, in operation S430, a request is sent to at least the second application to store the update data (i.e., update data from the import file for view parameters for storage in resource tables associated with the second application) based on the obtained resource information (obtained in operation S420). That is, in response to the save data API call, a request is sent to each application associated with tables in which data included in a row of the import file is to be saved. The request is a save request to save corresponding data to the respective tables. For example, referring to TABLE 1 above, where a current view has parameters corresponding to four tables of four different applications (or microservices), the resource information obtained in operation S420 is of the four applications, and four requests are sent to the four applications (one to each) to save corresponding resource data. According to an embodiment, the four requests are sent based on the same generic save data API call. By way of example, each request may be passed or submitted to an API of or for each application associated with or including a table mapped to a parameter of the current view. For example, the API of each application may be a helper java code jar that contains a generic API and works as an intermediate between the first application and the other application for saving resource data.

In operation S440, the second application (or each application that receives the request of operation S430) stores the import data to at least one table, based on the received request.

Figure 5:
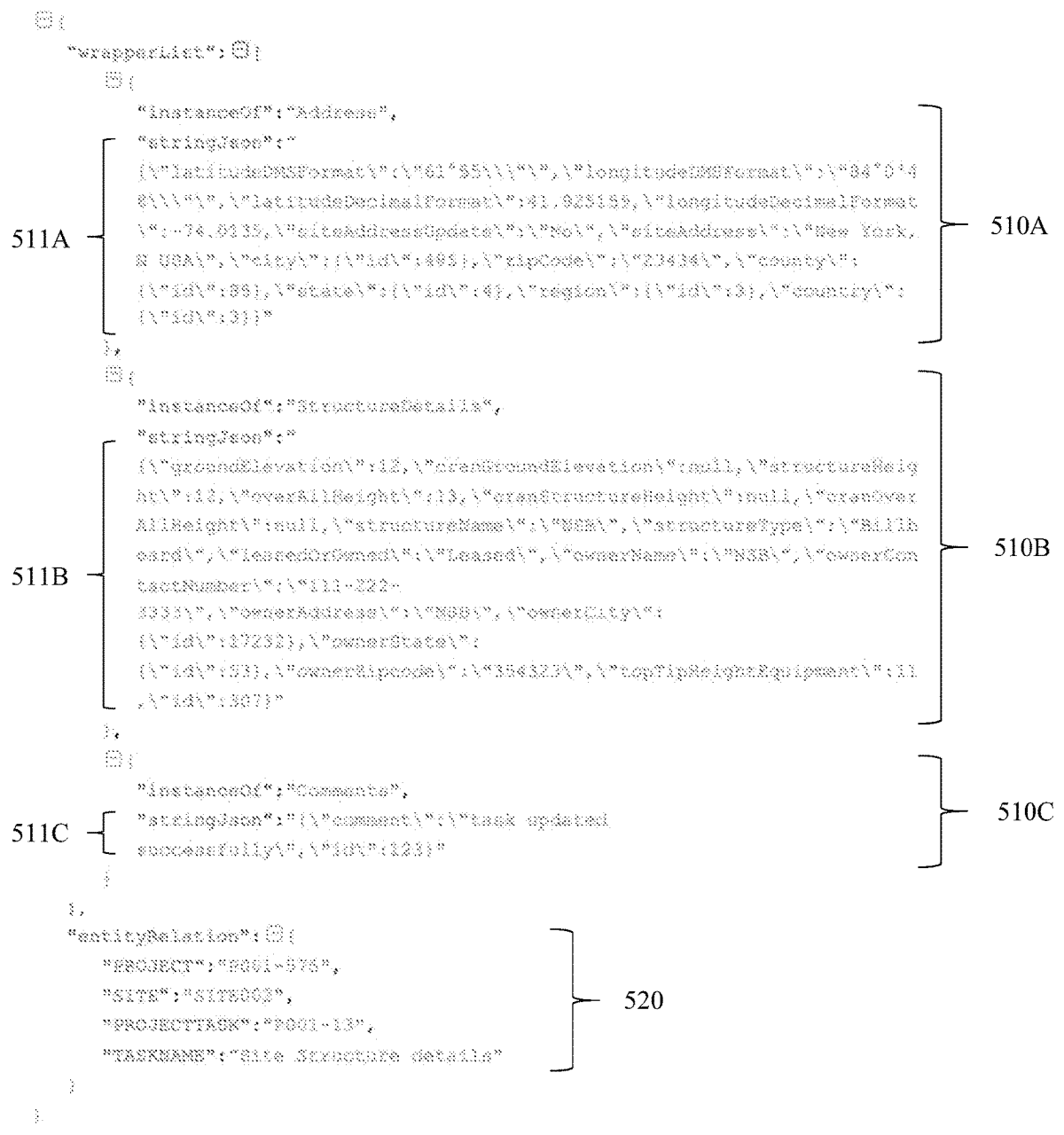

FIG. 5 illustrates an example of an input to a save data API in accordance with an embodiment. In the example of FIG. 5, the input to the save data API includes a list of JSON strings 511A, 511B, 511C, with each string corresponding to a different table.

In detail, execution logic of the first application or the import data API generates an input by grouping the update (or import, bulk import, etc.) data based on corresponding tables (or resources) to which the data is to be stored. The update data is obtained from a row of the import file, the parameter identifiers are obtained from either the row header or the metadata, and the table information is obtained from the metadata of the import file. In FIG. 5, the current view includes parameters corresponding to three database tables: "Address," "StructureDetails," and "Comments." Thus, the input includes three objects 510A, 510B, 510C respectively corresponding to three tables. Each object includes a JSON string 511A, 511B, 511C in which the current view's parameters are provided with the values of the corresponding data to those parameters. The parameters included in each JSON string 511A, 511B, 511C are those which belong to (i.e., have their data stored in) the respective table for that string. For example, the table "Comments" stores data to the parameters "comment" and "id," as set forth in the corresponding string 511C.

The input to the save data API further includes an "entityRelation" object 520 in which primary keys and their values are set forth. The primary keys are used to uniquely identify the record for the current row of data. That is, the primary keys are used to identify resource mapping to create and/or update resource data (i.e., the parameter data saved in the resources/tables). In an embodiment, each table may be understood as a table of rows and columns, with the columns corresponding to respective parameters, and each row providing a different record or object of data for those parameters. Thus, each row may correspond to a different record or instance of the view (i.e., row of the import file). The record is uniquely identified by a primary key value, e.g., a column may correspond to a primary key and the values in that column are unique to each row (such as a project number, a site identifier, a project task, and a task name).

Figure 6:
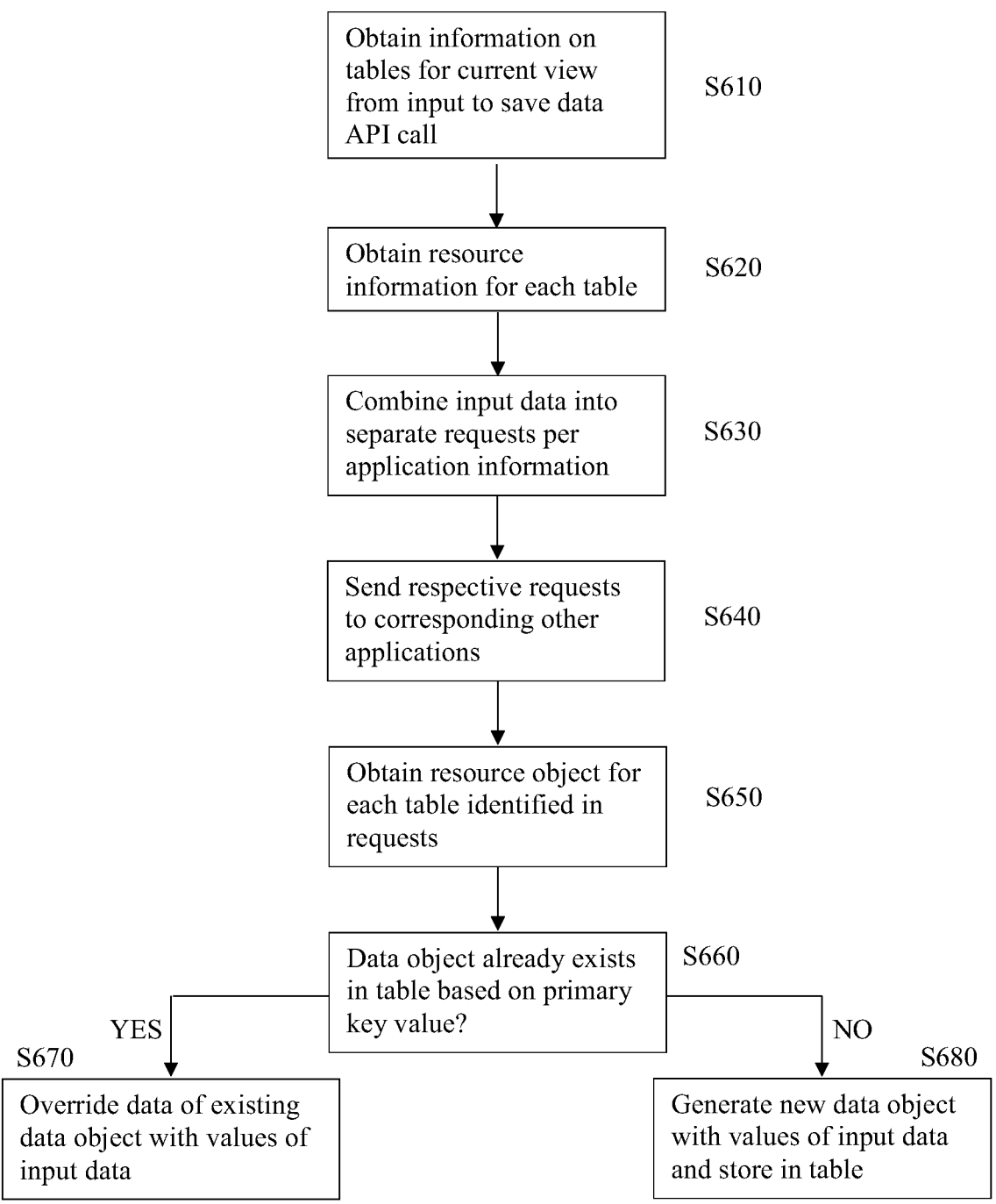
FIG. 6 illustrates a flowchart of a method for storing data of a view, according to an embodiment.

FIG. 6 illustrates a flowchart of a method 600 for storing data of a view as obtained from an import file, according to an embodiment. The method 600 of FIG. 6 may be performed by at least one processor executing instructions stored in at least one memory. For example, the method 600 of FIG. 6 may correspond to operations S420 through S440 of FIG. 4.

Referring to FIG. 6, at operation S610, information on tables for a current view is obtained from the input to the save data API. In particular, identifiers of the tables included in the input to the save data API are obtained. For example, where the input is a JSON format (as exemplified in FIG. 2), the input is parsed into a plurality of objects each corresponding to a different table.

At operation S620, resource information (e.g., application/microservice name, path/URL, etc.) is obtained for each of the tables. According to an embodiment, the resource information is obtained from the metadata included in the import file, although it is understood that one or more other embodiments are not limited thereto, as set forth above.

At operation S630, the parameter data (i.e., update or import data in a row of the import file, that is included, e.g., in the input to the save data API) that belongs to the same resource information (i.e., the same application or microservice path/URL) is combined. For example, where the resource information indicates that a first set of tables (among the tables identified in the input to the save data API) are associated with (or included in) a second application or microservice and that a second set of tables (among the tables identified in the input to the save data API) are associated with a third application or microservice, the first application (or the save data API) combines the update/import data, parameter identifiers, and/or table identifiers corresponding to the first set of tables into a first request, and combines the update/import data, parameter identifiers, and/or table identifiers corresponding to the second set of tables into a second request. Each request may have a JSON format similar to that of FIG. 5, and may include one or more primary keys relevant to that request (e.g., relevant to the microservice or tables of that request).

At operation S640, the respective requests are sent to the corresponding other applications or microservices. Taking the example described above, the first request may be submitted as an input to an API of the second application, and the second request may be submitted as an input to an API of the third application. All or some of operations S610 through S640 may be performed by execution logic of the save data API.

At operation S650, the other application or microservice processes the request to obtain a resource object for each table identified or included in the request. For example, where the request is in a JSON format (such as shown in FIG. 5), the JSON string for each table is parsed or converted to a JAVA object. In an embodiment, the API of the other application may create a JAVA resource (or table) object by casting the request input to a resource JAVA class.

At operation S660, a value of the primary key included in the resource object is checked against the corresponding table, to determine whether a data object (or record) already exists with that value.

If the data object already exists (Yes at S660), the data of that object is overridden with the values of the input data included in the resource object and stored in the table at operation S670. That is, the update data overrides or replaces the previous data or inputs for that record. By way of example, the existing data object is fetched from the table using a generic search method of that table (with the primary key value as an input). A JAVA reflection API may then be used to override the values (resource data) in the old data object with the new (i.e., update) values included in the JSON string (i.e., in the resource object). The new data object is then passed to a service layer create method for the resource (table).

If the data object does not already exist (No at S660), then a new record or entry in the table is generated at operation S680, e.g., the data in the resource object is saved in a new row of the table. In an example, a new data object with the input data is passed to a service layer create method of the table. By way of example, a user may create new instances of a view by modifying the file to include a new row.

Operations S650 through S680 are performed by each of the other applications identified in the resource information of operation S620, e.g., the APIs of each of the other applications called in operation S640. Further, operations S660 through S680 are iterated or repeated for each resource object (table) included in the request (i.e., for which input data is to be stored by the other application). Based on completion of the storing, each of the other applications (e.g., APIs of the other applications/microservices) may return a response to the first application (or the save data API) indicating completion of the storage of the view input data. The save data API may combine the responses and confirm completion, and return a single response to the first application or the import data API. Upon completion of the process for all rows of the data, the first application (e.g., view UI) may output a message to a user confirming that the data has been updated or stored.

Figure 7:
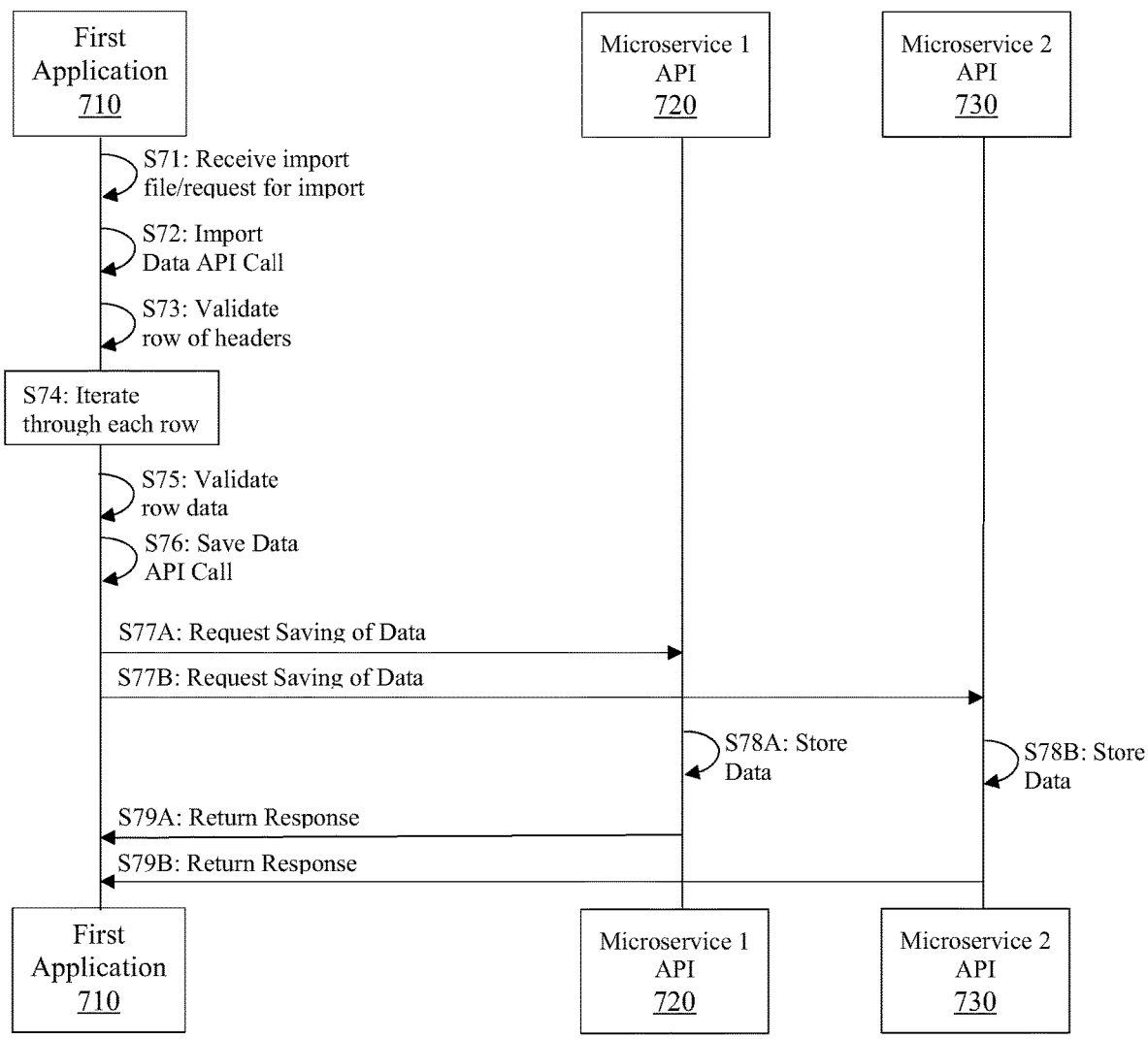
FIG. 7 illustrates a call flow diagram for bulk updating resource data for a plurality of instances of a view, according to an embodiment.

FIG. 7 illustrates a call flow diagram 700 for bulk updating resource data for a plurality of instances of a view, according to an embodiment. The operations shown in FIG. 7 may be performed by at least one processor executing instructions stored in at least one memory.

Referring to FIG. 7, at S71, a first application 710 (e.g., view builder or data viewing application or UI) receives an import file with a request to bulk save or update resource data for a plurality of instances of a view, as provided in the import file.

At S72, the first application 710 makes an import data API call. An input to the import data API call includes at least the import file.

At S73, a row of column headers included in the import file is validated with metadata included in the import file. For example, the identifiers of parameters included in row of column headers is compared with parameter identification information included in the metadata to ensure correspondence or matching. If the validation fails, then the process ends and an error is output. The validation may be performed by the import data API (which may be integrated or incorporated with the first application).

At S74, based on the validation succeeding, each row of parameter data (i.e., import or update data) is iterated. The subsequent operations are performed for each row.

At S75, each entry of data in a row is validated based on metadata included in the import file. For example, cell or parameter details are obtained or fetched from the metadata, and the each entry of data is confirmed to satisfy the requirements of the cell or parameter details. The validation may be performed by the import data API.

Based on successful validation, at S76, a save data API call is made. The call may be made by the import data API. An input to the save data API call may include the data included in the corresponding row for which the call is made (i.e., corresponding to an instance of the view), identification information of the parameters of the view (obtained from the metadata), and identification information of the tables corresponding to those parameters (obtained from the metadata).

At S76, the save data API (which may be integrated into or with the first application) obtains resource information corresponding to the tables identified in the input to the save data API call. For example, the resource information may be obtained from the metadata included in the import file. The resource information identifies the application(s) including or associated with the tables in which the data input to the parameters of the current view are to be stored. Alternatively, the resource information may be obtained from the metadata (or a resource information table) by backend logic or execution logic of another API or the first application and provided to the save data API.

At S77A and S77B, the first application 310 (or save data API) sends requests to respective APIs 720 and 730 of each microservice included or identified in the resource information, in order to store corresponding data (i.e., values of the parameters included in the current view) to the relevant tables (i.e., the tables in which parameter data of the current view are stored). Each request includes the relevant data, parameter identification information, and primary key(s) information (e.g., identification information and value).

At S78A and S58B, each microservice API 720, 730 checks the primary key value for each table to determine whether to update an existing data object or record, or create a new data object or record, and stores the data in the table (as an update or override as a new entry).

At S79A and S79B, each of the microservice APIs 720, 730 returns a response informing or confirming completion of the storage.

As set forth above, the import data API repeats S74 onward for each of the rows of data, thereby achieving a bulk import of data (e.g., update data) with generic APIs and logic that is applicable to any view and any set of backend resource tables.

Figure 8:
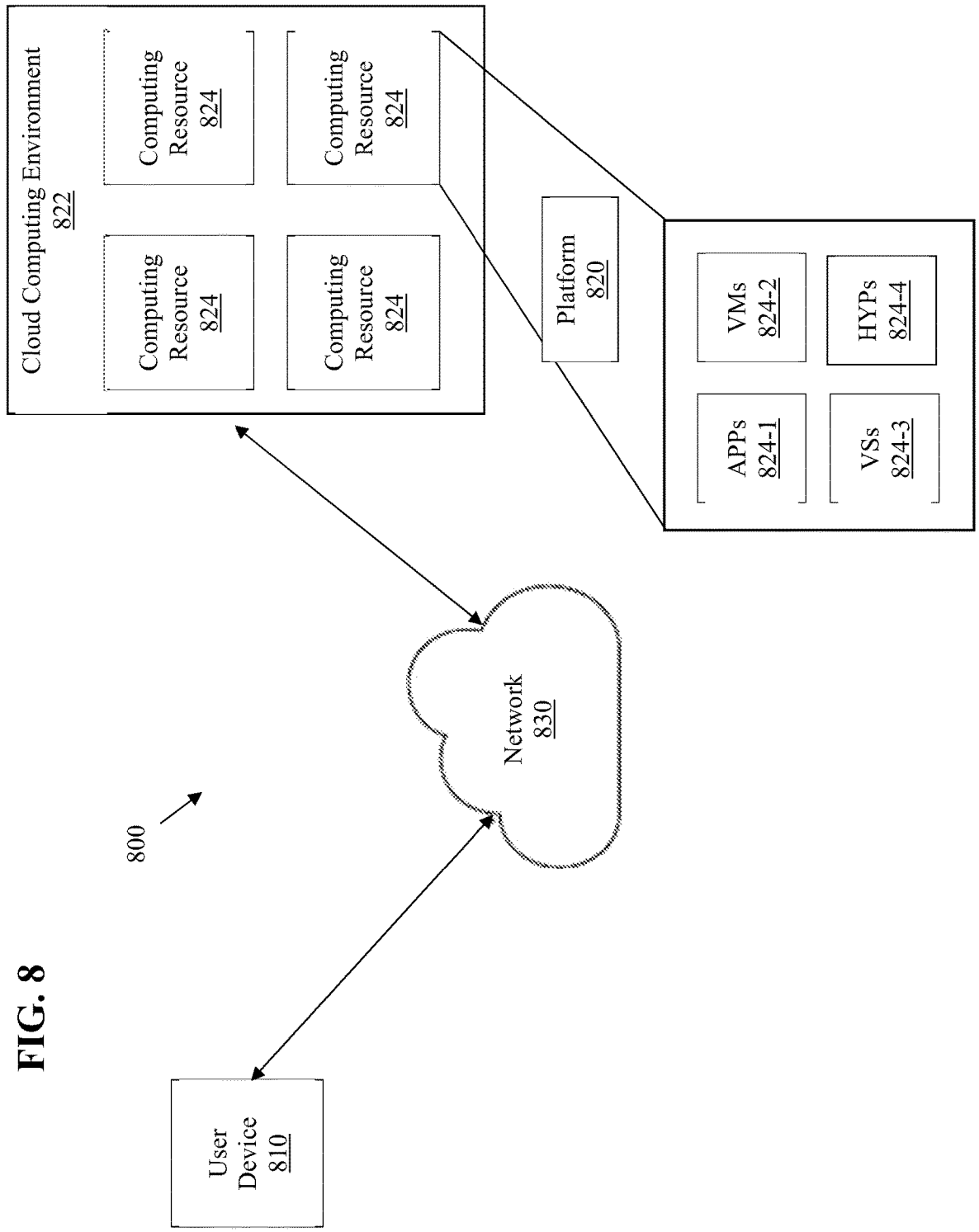
FIG. 8 is a diagram of an example environment in which systems and/or methods, described herein, may be implemented.

FIG. 8 is a diagram of an example environment 800 in which systems and/or methods, described herein, may be implemented. As shown in FIG. 8, environment 800 may include a user device 810, a platform 820, and a network 830. Devices of environment 800 may interconnect via wired connections, wireless connections, or a combination of wired and wireless connections. In embodiments, any of the functions and operations described with reference to FIGS. 1 through 7 above may be performed by any combination of elements illustrated in FIG. 8.

User device 810 includes one or more devices capable of receiving, generating, storing, processing, and/or providing information associated with platform 820. For example, user device 810 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 810 may receive information from and/or transmit information to platform 820.

Platform 820 includes one or more devices capable of receiving, generating, storing, processing, and/or providing information. In some implementations, platform 820 may include a cloud server or a group of cloud servers. In some implementations, platform 820 may be designed to be modular such that certain software components may be swapped in or out depending on a particular need. As such, platform 820 may be easily and/or quickly reconfigured for different uses.

In some implementations, as shown, platform 820 may be hosted in cloud computing environment 822. Notably, while implementations described herein describe platform 820 as being hosted in cloud computing environment 822, in some implementations, platform 820 may not be cloud-based (i.e., may be implemented outside of a cloud computing environment) or may be partially cloud-based.

Cloud computing environment 822 includes an environment that hosts platform 820. Cloud computing environment 822 may provide computation, software, data access, storage, etc., services that do not require end-user (e.g., user device 810) knowledge of a physical location and configuration of system(s) and/or device(s) that hosts platform 820. As shown, cloud computing environment 822 may include a group of computing resources 824 (referred to collectively as "computing resources 824" and individually as "computing resource 824").

Computing resource 824 includes one or more personal computers, a cluster of computing devices, workstation computers, server devices, or other types of computation and/or communication devices. In some implementations, computing resource 824 may host platform 820. The cloud resources may include compute instances executing in computing resource 824, storage devices provided in computing resource 824, data transfer devices provided by computing resource 824, etc. In some implementations, computing resource 824 may communicate with other computing resources 824 via wired connections, wireless connections, or a combination of wired and wireless connections.

As further shown in FIG. 8, computing resource 824 includes a group of cloud resources, such as one or more applications ("APPs") 824-1, one or more virtual machines ("VMs") 824-2, virtualized storage ("VSs") 824-3, one or more hypervisors ("HYPs") 824-4, or the like.

Application 824-1 includes one or more software applications that may be provided to or accessed by user device 810. Application 824-1 may eliminate a need to install and execute the software applications on user device 810. For example, application 824-1 may include software associated with platform 820 and/or any other software capable of being provided via cloud computing environment 822. In some implementations, one application 824-1 may send/receive information to/from one or more other applications 824-1, via virtual machine 824-2.

Virtual machine 824-2 includes a software implementation of a machine (e.g., a computer) that executes programs like a physical machine. Virtual machine 824-2 may be either a system virtual machine or a process virtual machine, depending upon use and degree of correspondence to any real machine by virtual machine 824-2. A system virtual machine may provide a complete system platform that supports execution of a complete operating system ("OS").

A process virtual machine may execute a single program, and may support a single process. In some implementations, virtual machine 824-2 may execute on behalf of a user (e.g., user device 810), and may manage infrastructure of cloud computing environment 822, such as data management, synchronization, or long-duration data transfers.

Virtualized storage 824-3 includes one or more storage systems and/or one or more devices that use virtualization techniques within the storage systems or devices of computing resource 824. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 824-4 may provide hardware virtualization techniques that allow multiple operating systems (e.g., "guest operating systems") to execute concurrently on a host computer, such as computing resource 824. Hypervisor 824-4 may present a virtual operating platform to the guest operating systems, and may manage the execution of the guest operating systems. Multiple instances of a variety of operating systems may share virtualized hardware resources.

Network 830 includes one or more wired and/or wireless networks. For example, network 830 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 8 are provided as an example. In practice, there may be additional devices and/or networks, fewer devices and/or networks, different devices and/or networks, or differently arranged devices and/or networks than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) of environment 800 may perform one or more functions described as being performed by another set of devices of environment 800.

Figure 9:
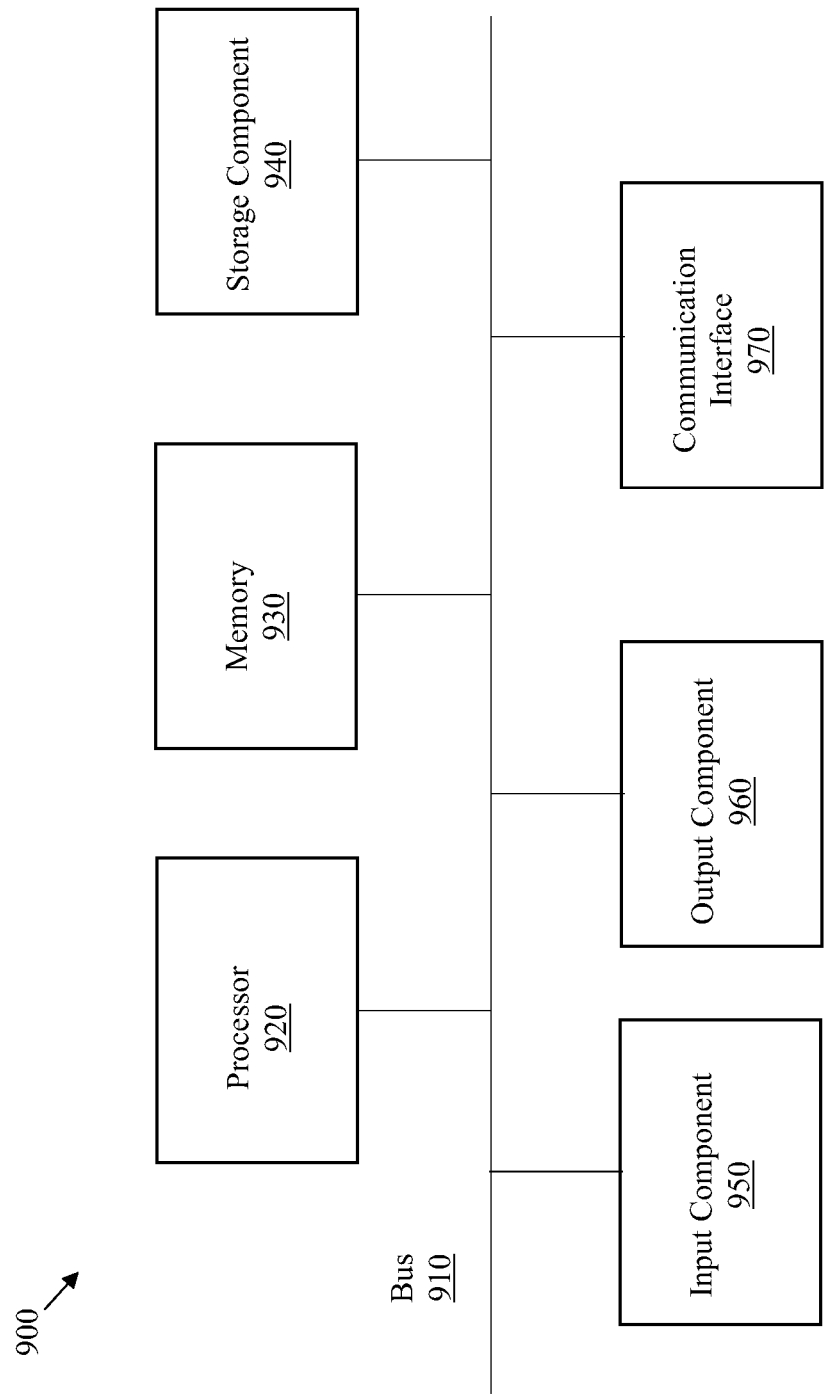
FIG. 9 is a diagram of example components of a device according to an embodiment.

FIG. 9 is a diagram of example components of a device 900. Device 900 may correspond to user device 810 and/or platform 820. As shown in FIG. 9, device 900 may include a bus 910, a processor 920, a memory 930, a storage component 940, an input component 950, an output component 960, and a communication interface 970.

Bus 910 includes a component that permits communication among the components of device 900. Processor 920 may be implemented in hardware, firmware, or a combination of hardware and software. Processor 920 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 920 includes one or more processors capable of being programmed to perform a function. Memory 930 includes a random access memory (RAM), a read only memory (ROM), and/or another type of dynamic or static storage device (e.g., a flash memory, a magnetic memory, and/or an optical memory) that stores information and/or instructions for use by processor 920.

Storage component 940 stores information and/or software related to the operation and use of device 900. For example, storage component 940 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 950 includes a component that permits device 900 to receive information, such as via user input (e.g., a touch screen display, a keyboard, a keypad, a mouse, a button, a switch, and/or a microphone). Additionally, or alternatively, input component 950 may include a sensor for sensing information (e.g., a global positioning system (GPS) component, an accelerometer, a gyroscope, and/or an actuator). Output component 960 includes a component that provides output information from device 900 (e.g., a display, a speaker, and/or one or more light-emitting diodes (LEDs)).

Communication interface 970 includes a transceiver-like component (e.g., a transceiver and/or a separate receiver and transmitter) that enables device 900 to communicate with other devices, such as via a wired connection, a wireless connection, or a combination of wired and wireless connections. Communication interface 970 may permit device 900 to receive information from another device and/or provide information to another device. For example, communication interface 970 may include an Ethernet interface, an optical interface, a coaxial interface, an infrared interface, a radio frequency (RF) interface, a universal serial bus (USB) interface, a Wi-Fi interface, a cellular network interface, or the like.

Device 900 may perform one or more processes described herein. Device 900 may perform these processes in response to processor 920 executing software instructions stored by a non-transitory computer-readable medium, such as memory 930 and/or storage component 940. A computer-readable medium is defined herein as a non-transitory memory device. A memory device includes memory space within a single physical storage device or memory space spread across multiple physical storage devices.

Software instructions may be read into memory 930 and/or storage component 940 from another computer-readable medium or from another device via communication interface 970. When executed, software instructions stored in memory 930 and/or storage component 940 may cause processor 920 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 9 are provided as an example. In practice, device 900 may include additional components, fewer components, different components, or differently arranged components than those shown in FIG. 9. Additionally, or alternatively, a set of components (e.g., one or more components) of device 900 may perform one or more functions described as being performed by another set of components of device 900.

In embodiments, any one of the operations or processes of FIGS. 1 through 7 may be implemented by or using any one of the elements illustrated in FIGS. 8 and 9.

In accordance with example embodiments, a bulk import or update function integrated into a data view application utilizes a generic data storing mechanism to import and store resource data to various resources (e.g., columns of tables). As a result, the import function may be generically used to bulk import or update resource data for any of plural views and for any configuration or modification of a view, thereby eliminating the required development and attendant user inconvenience and time to configure customized APIs and mechanisms by which resource data is input and updated, and thereby reducing the processing and hardware load for bulk updating resource data.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A system for bulk updating resource data of parameters included in a view, the system comprising:
    at least one memory storing instructions; and
    at least one processor configured to execute the instructions to:
        receive a user request to bulk import data of the parameters for a plurality of instances of the view, the received user request including a file comprising rows of the data, each row corresponding to a different instance of the view;
        based on the received user request, make, by a first application, an import data application programming interface (API) call to bulk import the data into one or more tables to which the data of the parameters is to be saved;
        based on the import data API call, make a save data API call to update existing resource data of the parameters, stored in the one or more tables, with the data included in the file; and
        based on the save data API call, update, in the one or more tables, the existing resource data of the parameters for the plurality of instances with the data included in the file,
    wherein the import data API and the save data API are generic across a plurality of views and a plurality of tables.

2. The system as claimed in claim 1, wherein the file further comprises:
    a row of column headers with identifiers of the parameters included in respective columns of each of the rows of data; and
    metadata including the identification information of the parameters, validation information for each parameter, and table information indicating the one or more tables for which resource data of the parameters is stored.

3. The system as claimed in claim 2, wherein the at least one processor is further configured to execute the instructions to, based on the import data API call, validate the row of column headers with the metadata by confirming that identifiers of the parameters included in the row of column headers correspond to the identification information of the parameters.

4. The system as claimed in claim 2, wherein the at least one processor is further configured to execute the instructions to:
for each of the data in a row, perform a validation by comparing the data to the validation information; and
make the save data API call for a row based on the validation being performed successfully.

5. The system as claimed in claim 1, wherein:
the save data API call is made separately for each of the rows of the data; and
an input to the save data API comprises identifiers of the one or more tables, identifiers of the parameters, and data included in a corresponding row for which the save data API is called.

6. The system as claimed in claim 5, wherein the at least one processor is further configured to execute the instructions to:
obtain information of a second application;
send, based on the obtained information of the second application, a request to the second application to store first data, from among the data, of at least one first parameter, from among the parameters, to at least one table associated with the second application, from among the one or more tables; and
store, by the second application, the first data to the at least one table.

7. The system as claimed in claim 5, wherein:
the at least one processor is further configured to execute the instructions to obtain identifiers of one or more primary keys corresponding to the view; and
the input to the save data API further comprises the identifiers of the one or more primary keys, and one or more primary key values corresponding to the instance of the view.

8. The system as claimed in claim 7, wherein the at least one processor is further configured to execute the instructions to, for each of the at least one table, search for an existing data object or record corresponding to a primary key value of the one or more primary key values.

9. The system as claimed in claim 1, the at least one processor is further configured to execute the instructions to:
generate a response file indicating, for each of the rows of the data, whether the updating is successfully; and
return, by the import data API, the generated response file for output to a user.

10. A method, performed by at least one processor, for bulk updating resource data of parameters included in a view, the method comprising:
receiving a user request to bulk import data of the parameters for a plurality of instances of the view, the received user request including a file comprising rows of the data, each row corresponding to a different instance of the view;
based on the received user request, making, by a first application, an import data application programming interface (API) call to bulk import the data into one or more tables to which the data of the parameters is to be saved;
based on the import data API call, making a save data API call to update existing resource data of the parameters, stored in the one or more tables, with the data included in the file; and based on the save data API call, updating, in the one or more tables, the existing resource data of the parameters for the plurality of instances with the data included in the file,
wherein the import data API and the save data API are generic across a plurality of views and a plurality of tables.

11. The method as claimed in claim 10, wherein the file further comprises:
a row of column headers with identifiers of the parameters included in respective columns of each of the rows of data; and
metadata including the identification information of the parameters, validation information for each parameter, and table information indicating the one or more tables for which resource data of the parameters is stored.

12. The method as claimed in claim 11, further comprising, based on the import data API call, validating the row of column headers with the metadata by confirming that identifiers of the parameters included in the row of column headers correspond to the identification information of the parameters.

13. The method as claimed in claim 11, wherein the making the save data API call comprises:
for each of the data in a row, performing a validation by comparing the data to the validation information; and
making the save data API call for a row based on the validation being performed successfully.

14. The method as claimed in claim 10, wherein:
the save data API call is made separately for each of the rows of the data; and
an input to the save data API comprises identifiers of the one or more tables, identifiers of the parameters, and data included in a corresponding row for which the save data API is called.

15. The method as claimed in claim 14, wherein the updating the existing resource data comprises:
obtaining information of a second application;
sending, based on the obtained information of the second application, a request to the second application to store first data, from among the data, of at least one first parameter, from among the parameters, to at least one table associated with the second application, from among the one or more tables; and
storing, by the second application, the first data to the at least one table.

16. The method as claimed in claim 14, wherein:
the making the save data API call comprises obtaining identifiers of one or more primary keys corresponding to the view; and
the input to the save data API further comprises the identifiers of the one or more primary keys, and one or more primary key values corresponding to the instance of the view.

17. The method as claimed in claim 16, wherein the updating the existing resource data comprises, for each of the at least one table, searching for an existing data object or record corresponding to a primary key value of the one or more primary key values.

18. The method as claimed in claim 10, further comprising:
generating a response file indicating, for each of the rows of the data, whether the updating is successfully; and
returning, by the import data API, the generated response file for output to a user.

19. A non-transitory computer-readable recording medium having recorded thereon instructions executable by at least one processor to perform a method for bulk updating resource data of parameters included in a view, the method comprising:
- receiving a user request to bulk import data of the parameters for a plurality of instances of the view, the received user request including a file comprising rows of the data, each row corresponding to a different instance of the view;
- based on the received user request, making, by a first application, an import data application programming interface (API) call to bulk import the data into one or more tables to which the data of the parameters is to be saved;
- based on the import data API call, making a save data API call to update existing resource data of the parameters, stored in the one or more tables, with the data included in the file; and
- based on the save data API call, updating, in the one or more tables, the existing resource data of the parameters for the plurality of instances with the data included in the file,
- wherein the import data API and the save data API are generic across a plurality of views and a plurality of tables.

* * * * *